(12) United States Patent
Gajewski

(10) Patent No.: US 7,087,839 B2
(45) Date of Patent: Aug. 8, 2006

(54) SLACK-BASED METHOD FOR DETERMINING WIRE HARNESS TOLERANCE

(75) Inventor: Michael W. Gajewski, Troy, MI (US)

(73) Assignee: Yazaki North America, Inc., Canton, MI (US)

( * ) Notice: Subject to any disclaimer, the term of this patent is extended or adjusted under 35 U.S.C. 154(b) by 614 days.

(21) Appl. No.: 10/193,565

(22) Filed: Jul. 11, 2002

(65) Prior Publication Data

US 2004/0007380 A1 Jan. 15, 2004

(51) Int. Cl.
*H02G 3/00* (2006.01)

(52) U.S. Cl. ............... 174/72 A; 174/70 C; 174/135; 29/872; 248/73

(58) Field of Classification Search ............... 174/72 A, 174/70 C, 70 R, 72 C, 135, 136; 29/872, 29/33, 745, 755, 760, 868, 865, 854, 869; 439/34; 191/23 R; 248/65, 73; 296/146.9
See application file for complete search history.

(56) References Cited

U.S. PATENT DOCUMENTS

| | | | | |
|---|---|---|---|---|
| 5,460,530 A | * | 10/1995 | Toba et al. | 174/72 A |
| 5,735,041 A | * | 4/1998 | Zaguskin et al. | 29/857 |
| 5,743,010 A | * | 4/1998 | Zaguskin et al. | 29/857 |
| 5,929,382 A | * | 7/1999 | Moore et al. | 174/72 A |
| 6,286,203 B1 | * | 9/2001 | Yabe | 29/825 |
| 6,330,746 B1 | * | 12/2001 | Uchiyama et al. | 29/872 |
| 6,417,451 B1 | * | 7/2002 | Uchiyama | 174/72 A |
| 6,566,603 B1 | * | 5/2003 | Doshita et al. | 174/72 A |
| 6,610,929 B1 | * | 8/2003 | Motokawa | 174/72 A |

* cited by examiner

*Primary Examiner*—Dean A. Reichard
*Assistant Examiner*—Angel R. Estrada
(74) *Attorney, Agent, or Firm*—Young & Basile, P.C.

(57) ABSTRACT

A slack-based method for determining fastener placement tolerances for a wire harness relative to a vehicle mounting point layout. The method uses a determination of maximum permissible slack between pairs of adjacent mounting points to calculate tolerances for each point-to-point segment of the wire harness. The determination of maximum permissible slack is made by inspection of the vehicle mounting point layout between each set of mounting points, and in particular is based on real-life slack-limiting factors found to exist between the mounting points. The point-to-point tolerances are easily summed to determine an overall harness length sufficient to create the desired slack and tolerances. The overall length can be optimized for the greatest number of fastener placement options with the least amount of excess harness.

17 Claims, 6 Drawing Sheets

| LENGTH | TOLERANCE | CUMULATIVE TOLERANCE |
|---|---|---|
| 0 - 13 | -3    +3 | -3    +3 |
| 14 - 51 | -3    +10 | -10    +13 |
| 52 - 152 | -7    +10 | -10    +19 |
| 153 - 305 | -10   +13 | -13    +25 |
| 306 - 914 | -13   +19 | -19    +38 |
| 915 - 2540 | -25   +25 | -38    +51 |
| 2541 - 5080 | -38   +38 | -51    +76 |
| 5081 - UP | -51   +51 | -78    +102 |

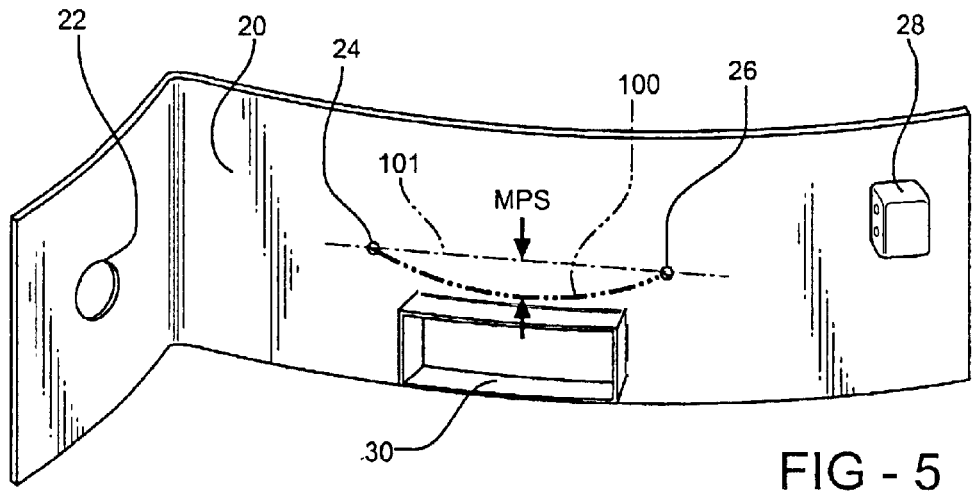
FIG - 5
FIG - 6
| DIM | SLACK | t |
|---|---|---|
| 200 | 15 | 2.24 ≈ 2 |
| 400 | 30 | 4.47 ≈ 4 |
| 180 | 13 | 1.87 ≈ 2 |
FIG - 8
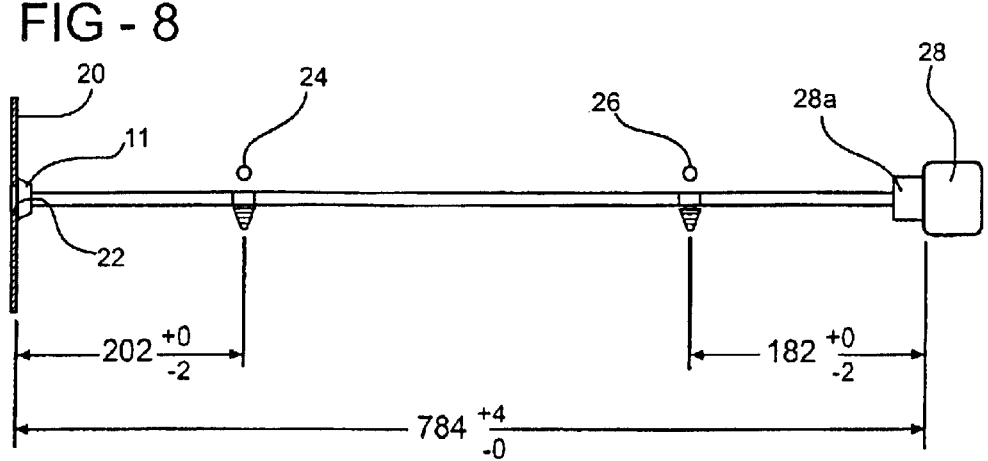

| CASE | DIM 1 (200 IDEAL) | DIM 2 (400 IDEAL) | DIM 3 (180 IDEAL) | | EXTRA | |
|---|---|---|---|---|---|---|
| 780 | 200 | 400 | 180 | 780 | 0 | — 1 |
| 781 | 201 | 400 | 180 | 781 | 0 | ⎫ 3 |
|  | 200 | 401 | 180 | 781 | 0 | ⎬ |
|  | 200 | 400 | 181 | 781 | 0 | ⎭ |
| 782 | 202 | 400 | 180 | 782 | 0 | ⎫ 5 |
|  | 201 | 401 | 180 | 782 | 0 | ⎪ |
|  | 200 | 402 | 180 | 782 | 0 | ⎬ |
|  | 200 | 401 | 181 | 782 | 0 | ⎪ |
|  | 200 | 400 | 182 | 782 | 0 | ⎭ |
| 783 | 202 | 401 | 180 | 783 | 0 | ⎫ 8 |
|  | 202 | 400 | 181 | 783 | 0 | ⎪ |
|  | 201 | 402 | 180 | 783 | 0 | ⎪ |
|  | 201 | 401 | 181 | 783 | 0 | ⎬ |
|  | 201 | 400 | 182 | 783 | 0 | ⎪ |
|  | 200 | 403 | 180 | 783 | 0 | ⎪ |
|  | 200 | 402 | 181 | 783 | 0 | ⎪ |
|  | 200 | 401 | 182 | 783 | 0 | ⎭ |
| 784 | 202 | 402 | 180 | 784 | 0 | ⎫ 9 |
|  | 202 | 401 | 181 | 784 | 0 | ⎪ |
|  | 202 | 400 | 182 | 784 | 0 | ⎪ |
|  | 201 | 403 | 180 | 784 | 0 | ⎪ |
|  | 201 | 402 | 181 | 784 | 0 | ⎬ |
|  | 201 | 401 | 182 | 784 | 0 | ⎪ |
|  | 200 | 404 | 180 | 784 | 0 | ⎪ |
|  | 200 | 403 | 181 | 784 | 0 | ⎪ |
|  | 200 | 402 | 182 | 784 | 0 | ⎭ |
| 785 | 202 | 403 | 180 | 785 | 0 | ⎫ 8 |
|  | 202 | 402 | 181 | 785 | 0 | ⎪ |
|  | 202 | 401 | 182 | 785 | 0 | ⎪ |
|  | 201 | 404 | 180 | 785 | 0 | ⎬ |
|  | 201 | 403 | 181 | 785 | 0 | ⎪ |
|  | 201 | 402 | 182 | 785 | 0 | ⎪ |
|  | 200 | 404 | 181 | 785 | 0 | ⎪ |
|  | 200 | 403 | 182 | 785 | 0 | ⎭ |
| 786 | 202 | 404 | 180 | 786 | 0 | ⎫ 6 |
|  | 202 | 403 | 181 | 786 | 0 | ⎪ |
|  | 202 | 402 | 182 | 786 | 0 | ⎬ |
|  | 201 | 404 | 181 | 786 | 0 | ⎪ |
|  | 201 | 403 | 182 | 786 | 0 | ⎪ |
|  | 200 | 404 | 182 | 786 | 0 | ⎭ |

FIG - 7

SLACK-BASED METHOD FOR DETERMINING WIRE HARNESS TOLERANCE

BACKGROUND OF THE INVENTION

Modern vehicles are equipped with numerous devices and systems that require electrical power from a vehicle power supply, typically a battery. Power (and increasingly, information) is commonly routed to those devices and systems through a wire harness comprising bundled conductors that snake through the vehicle's interior, branching as needed to reach each device and system requiring power. Wire harnesses must be securely fastened along their lengths, for support, to maintain clearance from hazards, and to eliminate rattle. The typical fastening technique is to first secure fasteners to the wire harness at predetermined intervals intended to match mounting holes, brackets, tape supports, and other convenient mounting points in the vehicle's interior, and then to install the fastener-equipped harness.

Because the dimensions of individual wire harnesses and the locations of corresponding mounting points and electrical systems in any given vehicle naturally vary, wire harnesses always include a certain amount of extra length or tolerance estimated for a given installation. Too little, and the harness isn't long enough to be connected properly; too much, and the cost and weight of the wire harness are unnecessarily increased, and installation is complicated by the need to secure the excess harness in a manner preventing rattle and contact with known hazards such as sharp edges, moving parts, hot surfaces, and others. This built-in extra length, while necessary, complicates the pre-placement of fasteners on the harness with proper tolerances between them for all of the fastener mounting points over the total length or "run" of the harness in the vehicle.

The usual prior art method for determining the optimal position for each fastener on a wire harness, which will be called "cumulative tolerancing", bases the location of each fastener from a single, fixed point of reference on the harness, usually from one end. The distance from each fastener to the reference point is assigned a given tolerance, i.e. the tolerances are length-specific according to a table or chart. These length-specific tolerances are added to the length of the wire harness, but the cumulative nature of the tolerances makes fastener placement confusing and difficult.

SUMMARY OF THE INVENTION

The present invention provides a method for pre-positioning fasteners on a vehicle harness to reduce slack between fastener position to acceptable levels when the harness is fastened into the vehicle. In general, the method comprises the steps of detemining the maximum permissable slack (MPS) between pairs of adjacent fastener mounting points, calculating an MPS length, and mounting fasteners on the harness in accordance with the MPS and required length. Where more than two fasteners are to be used, multiple MPS lengths are calculated and summed.

In its preferred form, the present invention eliminates the need to accumulate tolerance according to arbitrarily determined length-specific charts. The invention bases wire harness length and fastener location on the amount of empirically determined slack permitted between each pair of consecutive mounting points in the vehicle. After determining by inspection the maximum permissible slack ("MPS") between each set of adjacent mounting points in a vehicle, and knowing the "ideal"shortest-distance between each set of mounting points, the required tolerance for each leg of the harness sufficient to allow maximum permissible slack is calculated according to a simple formula. The overall length of the wire harness is then calculated by adding the sum of the slack-based tolerances to the "ideal"or minimum length of the wire harness. Fasteners can then be placed along the MPX- based overall length of the wire harness in accordance with the spacing options made possible by the slack-based tolerances calculated for each leg of the wire harness.

The MPS-based overall harness length is preferably refined by determining a "locus" of acceptable spacing options for each of several possible overall lengths within the range between ideal overall length and MPS overall length. This locus is the overall length between ideal and MPS that allows the greatest number of valid fastener placement options while keeping point-to-point slack within the corresponding MPS limit for each leg of the wire harness. While the greatest number of placement options will typically be preferred, the locus can be selected from anywhere within the ideal-to-MPS range that the builder or installer finds most convenient for a given installation.

Whether using the maximum MPS length or a shorter, optimal length, the fasteners are mounted on the wire harness according to the spacing options available for that overall length, and the fastener-equipped harness is then mounted in the vehicle.

The empirical determination of MPS for each leg of the wire harness can be based on nearly any criteria deemed suitable by the harness installer, but will always be a quantity capable of being gauged in reference to the actual installation environment. Slack-limiting factors will include "hazards" as described above, as well as aesthetic and efficiency factors that are more subjective.

It should also be understood that, although MPS nominally refers to maximum permissible slack, it can be set less than an actual maximum, depending on the desired slack tolerance over each leg of the harness. MPS can therefore be considered to include maximum desired slack within its definition.

These and other features and advantages of the invention will become apparent upon further reading of the specification, in view of the accompanying drawings.

BRIEF DESCRIPTION OF THE DRAWINGS

FIG. 5 is the same as FIG. 3, except for the addition of a broken line indicating the maximum permissible slack determined for each segment of the wire harness between mounting points.

FIG. 6 is a table of "Required Tolerance", comprising the extra length of wire harness needed between each set of mounting points to allow the MPS as determined in FIG. 5.

FIG. 7 is a table illustrating the determination of a "locus" of optimum overall harness length between the previously determined ideal and MPS lengths.

FIG. 8 is a distance schematic of the installation of FIG. 3, similar to FIG. 4 but with the slack-based tolerances now shown added to each segment of a wire harness about to be installed in accordance with the optimized overall length determined in FIG. 7.

DETAILED DESCRIPTION OF THE INVENTION

Figures 1, 2:
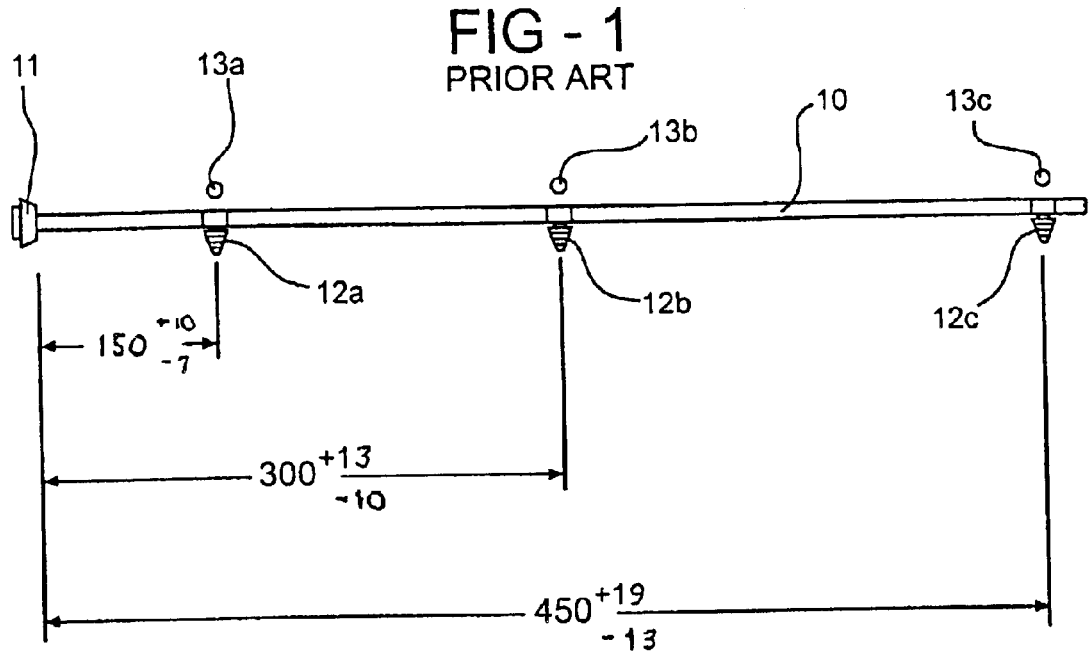
FIG. 1 is a schematic representation of a typical prior art wire harness and fastener tolerancing scheme using cumulative, length-specific tolerances based on the distance of each fastener from the end of the harness.
FIG. 2 is a typical prior art tolerance dimensioning table of the type used to calculate fastener locating tolerances and harness length in the cumulative fashion of FIG. 1.

FIG. 1 is a typical prior art dimensioning scheme for wire harness fastener tolerances. A wire harness 10, consisting of any known type and number of wires and/or conductors for electrical power and/or information, is typically provided with fasteners 12a–c mounted along its length in positions corresponding to anticipated mounting points 13a–c in a vehicle. Fasteners 12a–c can be any known type, including but not limited to "Christmas tree" clips, tape mounts, and bracket-mating structures. Fasteners 12a, 12b, and 12c are spaced from one end of harness 10 supported by a grommet 11 that functions as the tolerancing datum or reference point. For simplicity of explanation, only the first three fasteners are illustrated; it will be understood by those skilled in the art that a typical harness will have many more fasteners and mounting points in an actual installation.

The ideal distance for placement of fasteners 12a, 12b, and 12c from grommet end 11 in FIG. 1 are shown as 150 mm, 300 mm, and 450 mm, respectively. Using a table such as that shown in FIG. 2, a predetermined length-specific tolerance is assigned to each fastener.

FIGS. 1 and 2 illustrate how the prior art length-specific tolerances are accumulated over the length of the wire harness as the fasteners move farther from the reference end. Any excess tolerance for a given fastener will also naturally accumulate, resulting in excess wire harness that must be dealt with in the confines of the vehicle interior. The resulting wire harness installation is often less than neat and efficient, with the excess harness adding unnecessary weight to the vehicle, rattling around when the vehicle is underway, and requiring extra, ad hoc fastening solutions by the people installing the harness.

Figure 3:
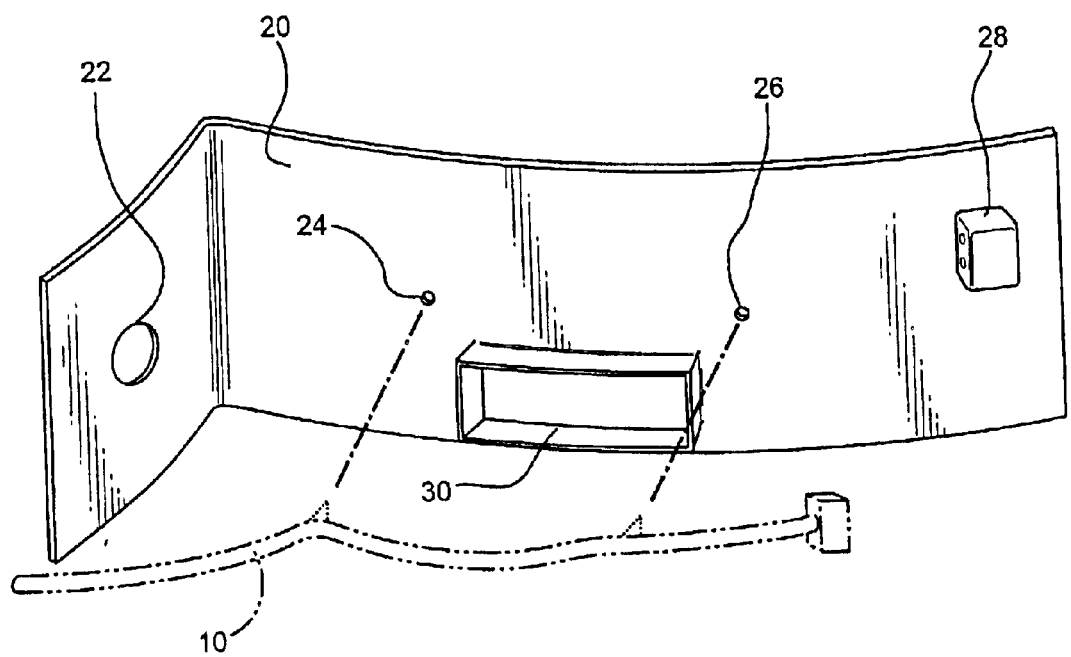
FIG. 3 is a schematic representation of a typical wire harness installation over a few segments of wire harness along a vehicle firewall, illustrating various mounting points and hazards.
Figure 4:
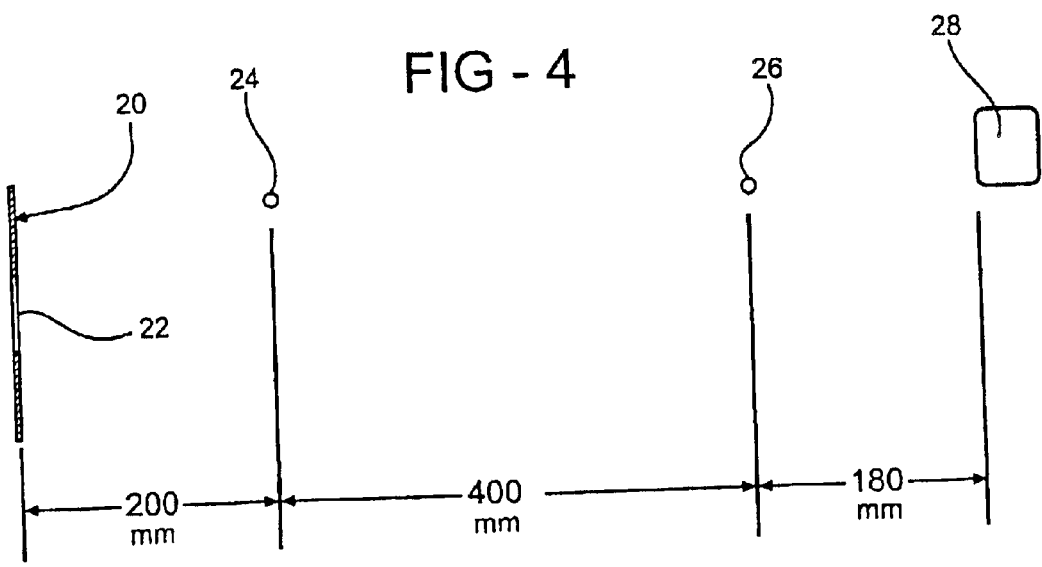
FIG. 4 is a schematic of the ideal (shortest or most direct) distances between the mounting points in FIG. 3.

Referring to FIGS. 3 and 4, a sample harness layout is shown schematically to illustrate the use of the present invention on a firewall 20. It will be understood that although a firewall installation is used herein for explanation, the methods described for tolerancing a wire harness for this sample installation are applicable to virtually any segment of any known wire harness with pre-positioned fasteners intended to match a previously determined layout of mounting points in a vehicle.

The wire harness mounting points in the firewall example of FIG. 3 are shown as a grommet mount 22, a clip hole 24 for a Christmas-tree type clip, a second clip hole 26, and an electrical device in the form of a relay 28. An air duct 30 protruding from firewall 20 between and below clip holes 26 and 28 is a common type of "hazard" to wire harness slack found in a vehicle, creating the potential for irritating rattle or undesirable wear on any portion of the harness in contact with the duct. Numerous other hazards will be familiar to those skilled in the art, including but not limited to door, window, trunk and hood closures; moving parts; sharp metal edges; hot surfaces; openings or areas exposed to the environment; hollow, noisy structures; and sensitive electronics. It will generally be desirable in routing a wire harness through a vehicle to avoid contact with any such hazards. Hence the importance of wire harness tolerancing and fastener placement.

FIG. 4 illustrates the "ideal" or shortest, most direct distance between the adjacent mounting points of the FIG. 3 installation. For precision, these would typically be determined by actual measurement in a sample vehicle. Assuming ideal distances on any less certain basis is possible, but creates the risk of reducing the effectiveness of the subsequent slack-based tolerancing method according to the invention.

FIG. 5 illustrates the preferred manner in which tolerances for each segment of the wire harness are determined according to the invention, namely by empirically determining the maximum permissible slack (MPS) for each segment between mounting points. This determination relies on an evaluation of the actual physical space, hazards, and obstructions found in a particular vehicle installation between each set of mounting points. A sample or simulated harness (preferably a short segment), represented by broken lines at 100 in FIG. 5, is physically placed between actual mounting points and the maximum vertical slack or "sag" of the harness relative to the ideal line 101 between two adjacent points is measured as MPS. It is immaterial whether two adjacent points define a line horizontal to the ground or are angled up or down; the semi-rigid nature of most wire harnesses makes it easy to take an MPS measurement by simply pulling the center of the harness segment away from the direct line. More supple harnesses can be allowed to freely hang or drape between the two points, with an MPS measurement taken at the natural trough of the harness.

However the MPS between points is determined or measured, it will always be a function of whatever slack-limiting obstructions, hazards or functional/aesthetic considerations actually exist between the points.

For example, in FIG. 3 the MPS between grommet mount 22 and clip hole 24 is determined by inspection to be 15 mm, not due to physical obstruction or hazard but because more would waste wire, look sloppy, and perhaps require impromptu taping against the firewall. MPS between clip holes 24 and 26 is determined to be 30 mm; any more would place the slack portion of the harness against the air duct, creating undesirable rattle and (if the duct opens toward the harness) obstructing air flow. MPS between clip hole 26 and relay 28 is determined to be 13 mm for reasons similar to the segment between grommet mount 22 and hole 24, and perhaps further because more slack would place undue strain on the connection of relay 28 to the firewall.

It will be understood that while actual physical measurement of a harness segment between mounting points in a vehicle is preferred, it is possible to model the mounting point layout in some fashion and then estimate MPS for the modeled distances and hazards. For example, the distance schematic of FIG. 4 could be established as a computer model of an actual layout, modified with the location of hazards such as the air duct 30, and MPS determined graphically or mathematically.

It will be repeated here that MPS need not be an actual permissible maximum, but can lie anywhere between ideal and maximum, as desired by the wire harness installer and/or builder. For example, it may be determined that two-thirds of any actual maximum will be the MPS limit for a given segment or installation. In this sense MPS can be defined as a maximum desired slack.

After the MPS has been determined for a given set of wire harness segments, the MPS value is used to calculate a "required tolerance" t for each segment to allow the MPS to be realized between the two mounting points. This calculation is made with the following formula derived from a geometric (triangular) approximation of the slack line between two points: $t=[\sqrt{(4s^2+L^2)}]-L$, where t is the tolerance, L is the ideal length between two mounting points, and s is maximum permissible slack (MPS) between those two points. Other formulas for calculating t which may be more or less exact than that used above are of course possible, and will be apparent to those skilled in the art. The formula used is not critical to the invention, so long as it gives a good approximation of the actual tolerance needed to achieve MPS. The value of t can even be measured directly using a harness segment, although it would be a time-consuming task.

With MPS and t determined for each of the wire harness segments, the sum of tolerances for the segments can be added together to determine the overall wire harness length. FIG. 6 is a table of the tolerances t determined for the MPS values in FIG. 5, rounded out to 2 mm, 4 mm, and 2 mm, respectively. This adds a total of 8 mm to the ideal wire harness length of 780 mm in the example of FIGS. 3 and 4, for an overall MPS length of 788 mm. This is the maximum length that the wire harness can run between the points illustrated and remain within the MPS for each segment. Using this maximum slack-based length value, fasteners can be mounted on the wire harness according to the possible permutations in distribution of the extra 8 mm among the three segments between grommet mount 22 and relay 28.

It is preferable, however, to determine an optimum overall harness length less than the maximum, in order to increase efficiency and to offer the builder the greatest number of valid fastener placement options. Referring to the table in FIG. 7, each of the possible overall harness lengths from 780 mm (ideal) to 786 mm (slightly less than MPS maximum) has its extra length distributed among the relevant harness segments in all possible permutations. It is readily apparent that at 784 mm the greatest possible number (nine) of MPS-compatible build options is available. Hence, an optimal overall length of 784 mm can be selected as the "locus" of acceptable dimension outcomes for the range between ideal and MPS maximum.

It will be understood that while the greatest number of build options is a preferred choice for the locus, any of the options above or below it are valid. Accordingly, the locus can be determined using other criteria than that shown. In preferred manner, the table in FIG. 7 only runs from the ideal (780 mm) to a length option (786 mm) less than true MPS (788 mm), in order to further safeguard against too much slack in the final placement of fasteners on the harness. By selecting a locus of build options from among length options a little less than true MPS, even the most aggressive build option in terms of length will be safely within slack limits for the installation.

FIG. 8 shows the application of the above-determined optimal length and fastener placement options to a wire harness intended for the firewall layout of FIG. 3, in schematic form. Any of the nine fastener placement options for the 784 mm length are valid as a nominal condition. However, since the air duct 30 under the middle segment of the firewall layout is perhaps the most significant slack-limiting factor, the length of the middle segment of the harness is set at the ideal length of 400 mm to avoid any possibility of contact with the air duct. This requires the third build option (row three) in the 784 mm table of FIG. 7. Accordingly, the first segment is set at 202 mm, the middle segment at 400 mm, and the last segment at 182 mm. Tolerances for fastener placement relative to these three segments are −2 mm, +4 mm, and −2 mm, respectively.

Figure 9:
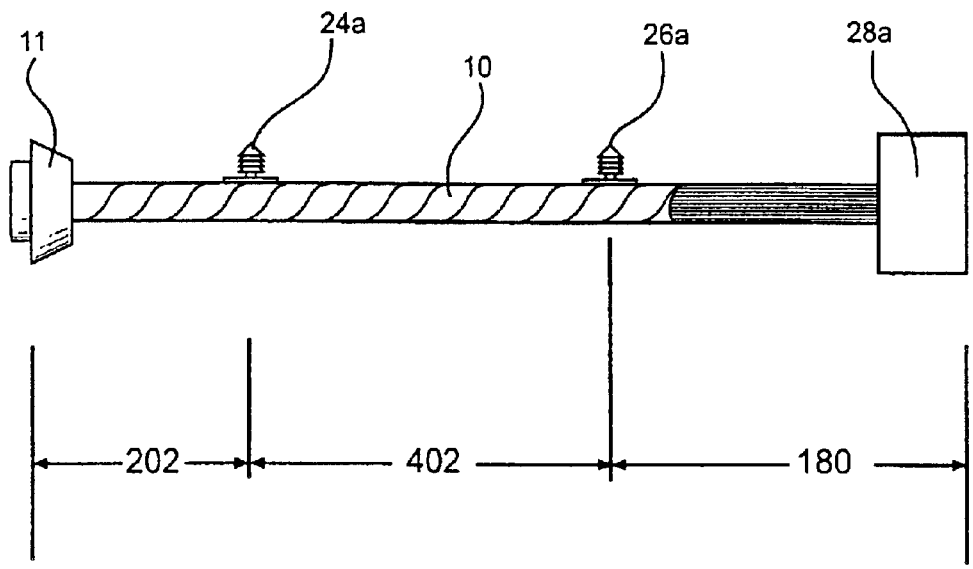
FIG. 9 illustrates a wire harness with fasteners mounted according to the slack-based tolerances and overall length of FIG. 8, showing installer error within the tolerance limits.

Referring to FIG. 9, the actual placement of the fasteners on wire harness 10 inevitably involves minor variations from the specified placement. Fastener 24a is shown correctly placed at the 202 mm mark from grommet 11, but fastener 26a is placed 2 mm further than specified, at 402 mm from fastener 24a rather than 400 mm. This results in a final segment length of 180 mm (including a relay connector portion 28a) rather than the specified 182 mm. These variances, however, are within the slack-based tolerances determined above, and are therefore acceptable for installation.

Figure 10:
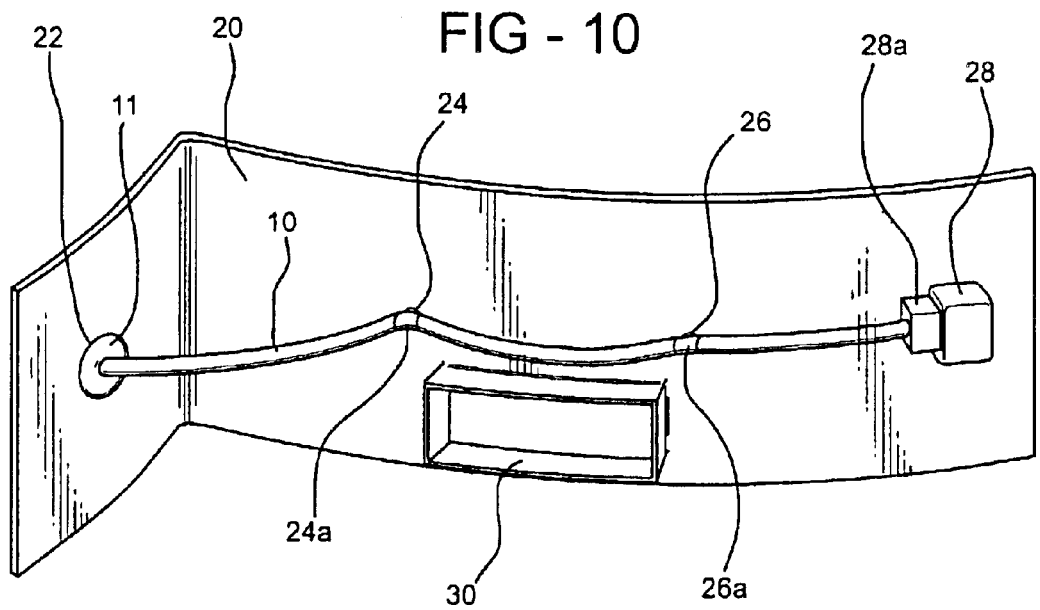
FIG. 10 illustrates the fastener-equipped wire harness of FIG. 9 mounted on the firewall layout of FIG. 3.

FIG. 10 shows the harness of FIG. 9 installed on the firewall 20 of FIG. 3. Sag or slack between grommet mount 22 and mounting hole 24 is caused by the difference between the ideal dimension (200 mm) and the manufactured dimension (202 mm); the slack is 11.3 mm, which is less than the MPS of 15 mm. The slack between mounting holes 24 and 26 is 14 mm, less than the 30 mm MPS allowance. There is no slack between mounting hole 26 and relay 28, because the manufactured dimension is equal to the ideal dimension and therefore within the MPS allowance.

Figure 11:
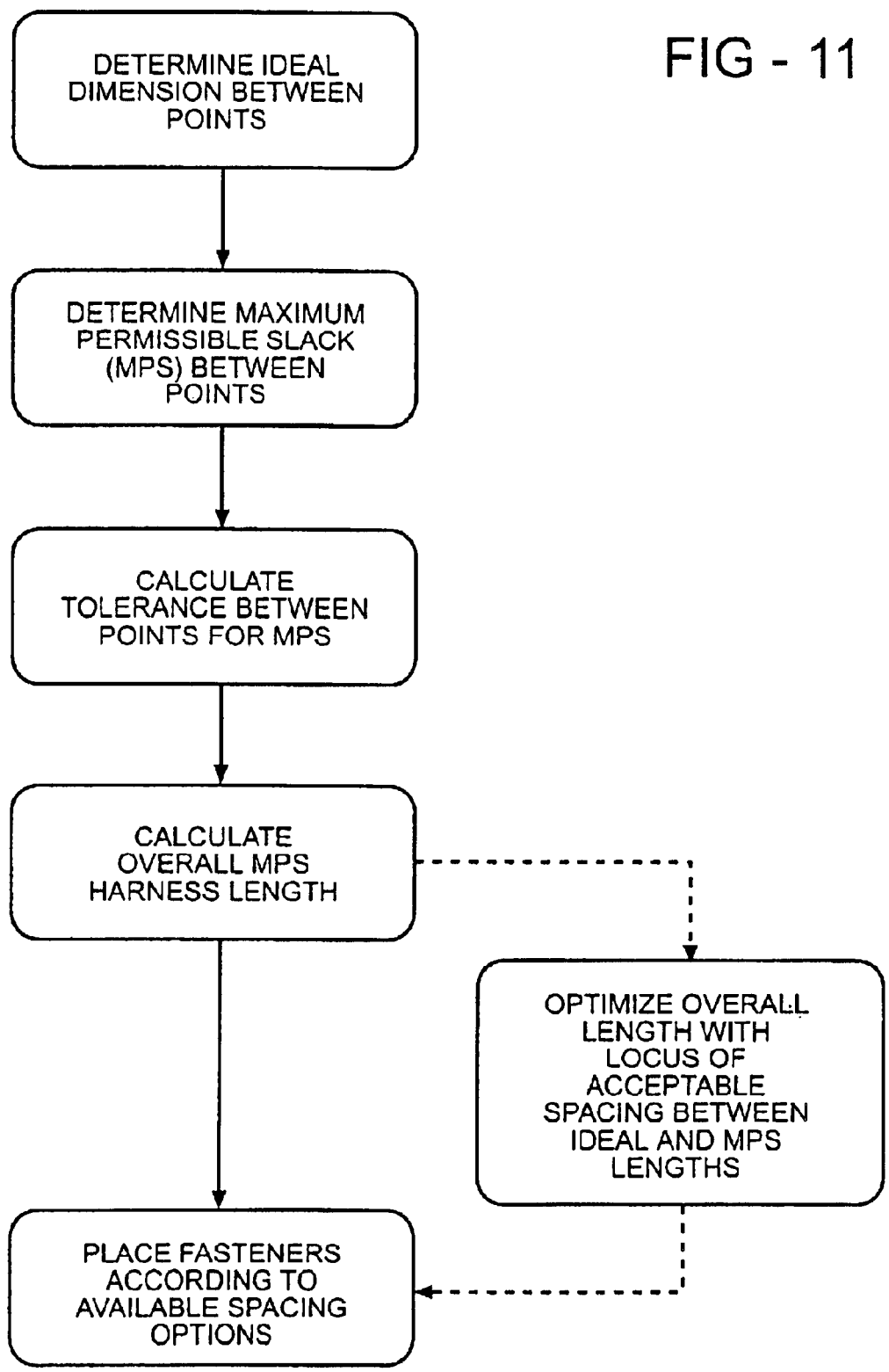
FIG. 11 is a flowchart representation of the method described in connection with FIGS. 3–9.

FIG. 11 illustrates the method described above in flowchart form. These are the fundamental steps through which appropriate fastener placement tolerances based on point-to-point slack are determined according to the invention. Optional steps are indicated with broken lines.

The above-described method of basing wire harness length and fastener placement tolerances on empirical, point-to-point slack allowance determinations gives more exact, less wasteful, less confusing-to-apply estimates of these measurements to the wire harness builder. The result is less work for the installer, and quieter, neater, lighter wire harness installations. It will be apparent to those skilled in the art that the method generally disclosed by example herein can be applied to virtually any wire harness installation in which it is possible to inspect or accurately model the actual mounting point layout in a vehicle prior to fastener placement on the harness.

I accordingly claim:

1. A method for pre-positioning fasteners on a vehicle wire harness to reduce excess harness when the fasteners are used to secure the harness at corresponding mounting points in a vehicle, comprising the steps of:
   determining a maximum permissible slack (MPS) between pairs of adjacent mounting points in a vehicle;
   calculating an MPS length for the wire harness between the pairs of adjacent mounting points sufficient to allow an amount of slack up to the maximum permissible slack; and
   mounting fasteners on the wire harness in positions providing up to the calculated MPS length between the pairs of adjacent mounting points.

2. The method of claim 1, further including the step of summing the MPS length of two or more consecutive wire harness segments to determine an overall MPS length for at least a portion of the wire harness.

3. The method of claim 1, wherein the step of calculating an MPS length comprises the steps of determining an ideal length for the harness between the pairs of adjacent mounting points, calculating a length tolerance t for the determined maximum permissible slack, and adding the tolerance t to the ideal length.

4. The method of claim 3, further including the step of determining fastener placement options between the ideal length and the MPS length and selecting one of the placement options from the ideal length up to a length less than or equal to the MPS length.

5. The method of claim 4, wherein the step of selecting one of the placement options is limited to selecting a length less than the MPS length.

6. The method of claim 4, wherein the step of selecting one of the placement options includes determining which of the options between ideal length and a length less than or equal to MPS length allows the greatest number of fastener placement options.

7. The method of claim 1, wherein the step of determining maximum permissible slack is performed by inspection of a vehicle wire harness mounting layout.

8. The method of claim 7, wherein the step of determining maximum permissible slack includes factoring in actual slack-limiting conditions between mounting points.

9. The method of claim 3 wherein the tolerance t is calculated from the formula $t=[\sqrt{}\sqrt{(4s^2+L^2)}]-L$, where s is the MPS between two mounting points and L is the ideal length between the two mounting points.

10. The method of claim 1 wherein the mounting step further comprises the step of mounting on the wire harness a plurality of at least one of Christmas-tree type clips, tape mounts and bracket-mating structures.

11. The method of claim 1 wherein the mounting step further comprises the step of mourning at least one grommet mount on the wire harness.

12. A method for pro-positioning fasteners on a vehicle wire harness to reduce excess harness when the fasteners are used to secure the harness at corresponding mounting points in a vehicle, comprising the steps of:

determining a maximum permissible slack between adjacent pairs of mounting points in a vehicle;

calculating a length for the wire harness between the adjacent pairs of mounting points sufficient to allow an amount of slack up to the maximum permissible slack; and mounting fasteners on the wire harness in positions determined by the length wherein slack of the wire harness between adjacent pairs of mounting points in the vehicle is no greater than the respective maximum permissible slack when the wire harness is secured in the vehicle.

13. The method of claim 12, further including the step of summing the length of two or more consecutive wire harness segments to determine an overall length for at least a portion of the wire harness.

14. The method of claim 12, wherein the step of calculating a length comprises the steps of determining an ideal length for the harness between the adjacent pairs of mounting points, calculating a length tolerance t for the determined maximum permissible slack, and adding the tolerance t to the ideal length.

15. The method of claim 14 wherein the tolerance t is calculated from the formula $t=[\sqrt{}\sqrt{(4s^2+L^2)}]-L$, where s is the MPS between the adjacent pairs of mounting points and L is the ideal length between the adjacent pairs of mounting points.

16. The method of claim 14, further including the step of determining fastens placement options between the ideal length and the length and selecting one of the placement options from the ideal length up to a length one of less than and equal to the length.

17. The method of claim 16, wherein the step of selecting one of the placement options includes determining which of the options between ideal length and a length less than or equal to MPS length allows the greatest number of fastener placement options.

* * * * *